March 6, 1928.

E. D. CHURCH

CAR COUPLER

Filed April 11, 1927

1,661,465

INVENTOR
Edgar D. Church
BY
George B. Willey
ATTORNEY

Patented Mar. 6, 1928.

1,661,465

UNITED STATES PATENT OFFICE.

EDGAR D. CHURCH, OF SAGINAW, MICHIGAN, ASSIGNOR TO JACKSON & CHURCH CO., OF SAGINAW, MICHIGAN, A CORPORATION OF MICHIGAN.

CAR COUPLER.

Application filed April 11, 1927. Serial No. 182,737.

This invention relates to car couplers and the object is to provide a simple and inexpensive coupler for industrial railway cars such as are used for charging the long horizontal steam drums used in the manufacture of sand lime brick and for similar uses where it is desirable that the coupler be made capable of extending horizontally to form a coupling hook and when pendent to form a car bumper.

Another object is to provide a simple means of holding the latch horizontal and to automatically release it to permit it to drop out of the way.

With the foregoing and certain other objects in view which will appear later in the specification, my invention comprises the devices described and claimed and the equivalents thereof.

In the drawings, Fig. 1 is a diagrammatic plan view of the ends of two cars with my improved coupler shown in its down position, acting as a bumper or pusher.

Figure 1:
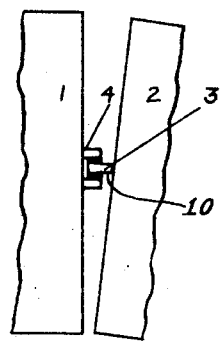

As shown in the drawings numerals 1 and 2 designate the ends of the two cars to be coupled and 3 is a hook-ended latch pivoted to a bracket 4 by means of pivot pin 5 so as to move up and down in a vertical plane. The pin 5 rests in bearing 6 on the bracket.

When raised to its horizontal position latch 3 passes a movable latch-supporting finger 7 which is pivoted to the bracket 4 and engages a shoulder 8 on the under side of the latch so as to support the latch horizontally while permitting it to have further upward movement in order to hook into the latch opening 2ª in the frame of another car 2. A projection or lug 9 on the frame prevents finger 7 from turning except into the upright position shown by dotted lines in Fig. 5.

Figure 3:
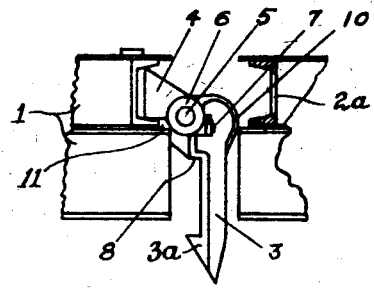
Fig. 3 is a detail side view of the coupler hook lowered.

When latch 3 is raised above its horizontal position finger 7 is moved to its vertical position and when the cars are uncoupled latch 3 drops to the down position shown in Fig. 3. When latch 3 is in this position that part of it nearest the pivot pin acts as a car bumper, and for that purpose it is formed on its upper face with a rounded projection 10 and on its lower face with a downwardly projecting lug 11, the end of which takes against the frame of car 1 so the impact of another car against bumper 10 will be received by car 1 without injuring the pivot pin 5.

The parts 10 and 11 project sufficiently from the end of the car to provide end clearance while the train is being pushed around a curve, as is indicated in Fig. 1.

Figure 2:
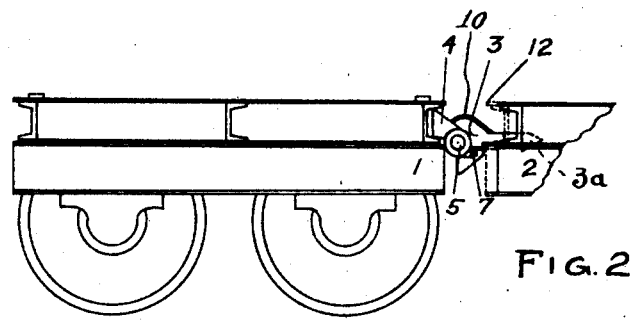
Fig. 2 is a side view of the parts shown in Fig. 1.

In Fig. 2 the dotted lines 12 indicate the amount of play which car 2 has with respect to latch 3 when the cars are uncoupled.

Figure 4:
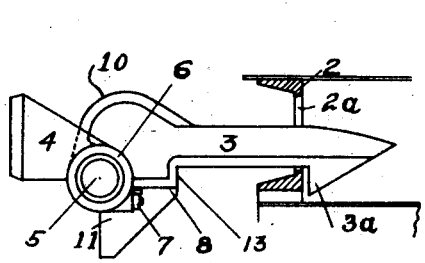
Fig. 4 is a similar view, showing the hook raised and engaged with the end of a car.

In operation the latch is positioned for automatic coupling by being raised to the horizontal position, shown in Figs. 2 and 4. The latch-supporting finger 7 is dropped by the operator and its end is set under the latch, as shown by full lines in Fig. 5. When so supported the latch is free to raise sufficiently to hook into the frame of the next car. The hooked end 3ª of the latch pulls car 2 in the usual way and the downwardly projecting shoulder 13 on the under side of the hook acts as a bumper when the cars are driven together endwise, as in sudden stopping of a train.

Figure 5:
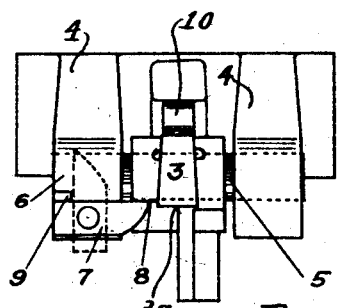
Fig. 5 is an enlarged end view of the coupler shown in Fig. 4.
Figure 6:
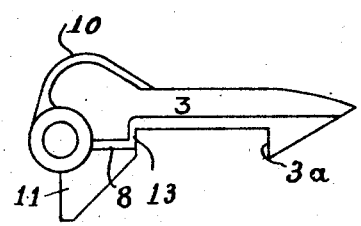
Fig. 6 is a side view of the hook member detached.

When the latch-supporting finger 7 is raised, as indicated by dotted lines in Fig. 5 the latch 3 drops to the pendent position of Fig. 3, where it is out of the way. In that position the two oppositely directed projections 10 and 11 on the latch near its pivot pin serve as a car bumper, because projection 10 when struck by another car transmits the shock through lug 11 to the frame of its car without danger of breaking the pivot pin 5. The amount of such end play is limited by shoulder 8 on the under side of latch 3.

By the means above described I have produced a simple and inexpensive coupler that can be raised to automatically couple and when uncoupled can be turned down out of the way and become a bumper that projects sufficiently to afford ample car-end clearance for rounding curves. Moreover, the bumper transmits all end shocks direct to the frame of the car, thereby avoiding wear on the coupler pivot. The coupler hook 3 remains horizontal only so long as it is supported by finger 7, and this support can be removed whenever the hook 3 is raised higher than the horizontal, as when it is being coupled with another car.

Having thus described my invention, what I claim and desire to secure by Letters Patent is:

1. In combination, a car truck, a bracket secured thereto, a latch having on its lower edge a downwardly projecting shoulder and having a hooked end, said latch pivoted to said bracket for up-and-down movement in a vertical plane, a movable latch-supporting finger and two oppositely directed projections on the latch near its pivot adapted, when the latch is pendent, to serve as a car bumper.

2. In combination, a car truck, a bracket secured thereto, a hook-ended latch pivoted to said bracket for up-and-down movement in a vertical plane, a movable latch-supporting finger pivoted to said bracket, and two oppositely directed projections on the latch near its pivot adapted, when the latch is pendent, to serve as a car bumper.

3. In combination, a car truck, a bracket secured thereto, a hook-ended latch pivoted to said bracket for up-and-down movement in a vertical plane, a movable latch-supporting finger and two oppositely directed projections on the latch near its pivot adapted, when the latch is pendent, to serve as a car bumper.

In testimony whereof, I affix my signature.

EDGAR D. CHURCH.